United States Patent
Gailloux et al.

(10) Patent No.: US 8,243,907 B1
(45) Date of Patent: Aug. 14, 2012

(54) POST-DIAL PRE-CONNECT HANDSET CUSTOMER CARE

(75) Inventors: Michael A. Gailloux, Overland Park, KS (US); Kenneth Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 857 days.

(21) Appl. No.: 12/265,410

(22) Filed: Nov. 5, 2008

(51) Int. Cl.
*H04M 3/42* (2006.01)
*H04M 15/00* (2006.01)
*H04M 11/00* (2006.01)

(52) U.S. Cl. ............... 379/207.02; 379/111; 379/114.2; 379/114.16; 379/114.17; 455/405; 455/406; 455/407

(58) Field of Classification Search ............. 379/207.02, 379/201.01, 111, 114.2, 114.16, 114.17, 379/114.15; 455/403, 406, 407, 405
See application file for complete search history.

(56) References Cited

U.S. PATENT DOCUMENTS

| | | | |
|---|---|---|---|
| 7,720,494 B2 | 5/2010 | Ahn | |
| 2004/0185827 A1* | 9/2004 | Parks | 455/406 |
| 2007/0254636 A1 | 11/2007 | Jiang | |
| 2009/0069040 A1 | 3/2009 | Wiesmuller et al. | |

OTHER PUBLICATIONS

Delker, Jason R., et al., Patent Application entitled, "Text Messages for Services," filed Jun. 29, 2009, U.S. Appl. No. 12/494,033.
Pre-Interview Communication dated Dec. 22, 2011, U.S. Appl. No. 12/494,033, filed Jun. 29, 2009.
First Action Interview Office Action dated Feb. 9, 2012, U.S. Appl. No. 12/494,033, filed Jun. 29, 2009.

\* cited by examiner

*Primary Examiner* — Thjuan K Addy

(57) ABSTRACT

A system is provided for handset customer care. The system includes a handset, which includes a processor, a display, a dialer component, and a care component. The dialer component, when executed by the processor, intercepts a connection request associated with an entered number, and determines whether the entered number is associated with a specified service. The care component, when executed by the processor, provides service options to the display in response to a determination that the entered number is associated with the specified service. The care component also receives selection of at least one of the service options, and communicates with a server based on the selection. The handset connects to the entered number in response to a determination that the entered number is not associated with the specified service.

20 Claims, 6 Drawing Sheets

US 8,243,907 B1

POST-DIAL PRE-CONNECT HANDSET CUSTOMER CARE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A handset may be a mobile phone, a wireless handset, a pager, a personal digital assistant, a gaming device, an inventory control device, a media player, a digital camera, or a digital calculator. When a handset user needs assistance in operating a handset, the user may contact their handset's network service provider through a customer care center.

SUMMARY OF THE INVENTION

In some embodiments, a system is provided for handset customer care. The system includes a handset, which includes a processor, a display, a dialer component, and a care component. The dialer component, when executed by the processor, intercepts a connection request associated with an entered number, and determines whether the entered number is associated with a specified service. The care component, when executed by the processor, provides service options to the display in response to a determination that the entered number is associated with the specified service. The care component also receives selection of at least one of the service options, and communicates with a server based on the selection. The handset connects to the entered number in response to a determination that the entered number is not associated with the specified service.

In some embodiments, a method is provided for handset customer care. A connection request associated with an entered number is intercepted. Whether the entered number is associated with a specified service is determined. Service options are provided to a handset display in response to a determination that the entered number is associated with the specified service. Selection of at least one of the service options is received. A server is communicated with based on the selection. The entered number is connected to via a connection that is determined based on communicating with the server. The entered number is connected to in response to a determination that the entered number is not associated with the specified service.

In some embodiments, a system is provided for handset customer care. The system includes a handset, which includes a processor, a display, a dialer component, and a care component. The dialer component, when executed by the processor, intercepts a connection request associated with an entered number, and determines whether the entered number is associated with a customer care center. The care component, when executed by the processor, provides customer care information to the display in response to a determination that the entered number is associated with the customer care center. The handset connects to the entered number in response to a determination that the entered number is not associated with the customer care center.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
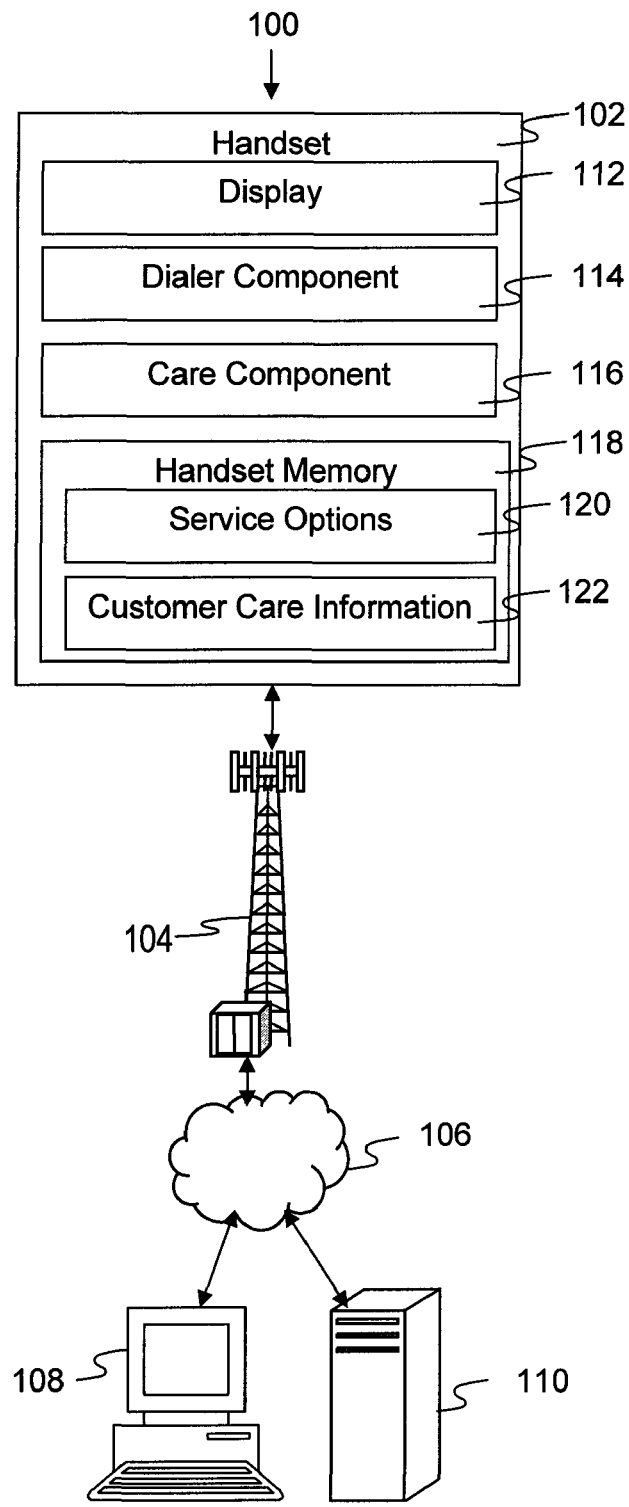
FIG. 1 shows a block diagram of a system for post-dial pre-connect handset customer care according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Network service providers may not charge their customers for the time spent communicating between their customers' handsets and their customer care centers. If a network service provider pays for such communications, the network service provider may reduce its own expenses by providing efficient customer care that minimizes the amount of time that their customers' handsets are communicating with their customer care centers, which may also increase customer satisfaction.

In some embodiments, a system is provided for handset customer care. A customer's handset includes a dialer component that maintains a list of service numbers that the customer may call, such as customer care center numbers. When the customer enters a number for the handset to call, the dialer component intercepts the call request and determines whether the entered number is on the list. If the number is not on the list, the handset attempts to call the entered number. However, if the number is on the list, a care component on the handset provides service options to the handset display. For example, the handset may display options to view information that has been already stored on the handset, for example in response to information periodically transmitted from the wireless service provider to the handset, such as the handset's type of calling plan, a recent amount of the prepaid handset minutes remaining on the calling plan, the amount of funds recently added to the calling plan, the date when funds were recently added to the calling plan, a recent bill, and the date when the next bill is due. Because nearly half of prepaid handset calls to customer care centers are requests for the minutes remaining on the calling plan, the network service provider may occasionally store this information on the handset via quickly sent messages in anticipation of such requests. Providing such options may significantly reduce the expenses incurred for prepaid handset calls to the customer care centers by reducing the number of such calls, as well as increasing customer satisfaction.

In another example, the handset may display options normally presented to the handset user by the network service provider's automated voice system. These options may identify the categories and sub-categories of assistance that may be requested, such as the steps for inquiring about a bill, requesting an update of the information that has been already stored on the handset, or for choosing a language for communicating with the customer care center. Providing these categories and sub-categories of options enables the handset to be quickly connected to a specific customer care representative without having to first connect to the customer care center and wait for the listing of multiple options before the customer selects options. Although providing categories and sub-categories of options may not reduce the number of calls to the customer care center, these options may significantly reduce the amount of time that customers are connected to the customer care center and listening to lists of options.

In yet another example, the handset communicates with a server based on a user selected option, such as requesting an update of the information that has been already stored on the handset. After the handset receives data from the server, the user may select to call a customer care center specialist about the received data. The handset responds to this selection by directing the call to a connection for a specialist that is determined by the received data, such as a specialist for bills when the handset has received a bill update. Either the handset or the server may provide the received data to the specialist to reduce the connection time that is paid for by the network service provider. Reducing the connection time that is paid for by the network service provider results in reducing expenses incurred by the network service provider.

FIG. 1 shows a block diagram of a system 100 for post-dial pre-connect handset customer care according to an embodiment of the present disclosure. The system 100 includes a handset 102, a base transceiver station 104, a network 106, a customer care center 108, and a server 110. The handset 102, which may be a handset that uses a prepaid billing plan, communicates with the base transceiver station 104, which is coupled to the network 106. The network 106 may enable the handset 102 to access a customer care center 108 for assistance with communication services and to access information on various servers, such as the server 110. The server 110 may be associated with the customer care center 108 or with an enterprise that is unrelated to the customer care center 108.

The handset 102 includes a display 112, a dialer component 114, a care component 116, and a handset memory 118. The handset memory 118 includes service options 120 and customer care information 122. The display 112 displays content to the user of the handset 102.

The dialer component 114 intercepts the numbers entered for the handset 102 to call, and determines whether the entered number is for a specific service listed in the handset memory 118, such as a customer care center. The intercepted number may be a full number, such as 1-800-366-0707, or a shortcut number, such as *12, which a network service provider may offer to customers to expedite calling the customer care center 108. If the entered number is not for a listed service, the dialer component 114 enables the handset 102 to attempt a call using the entered number.

The care component 116 provides the service options 120 to the display 112 if the entered number is for a listed service. The service options 120 may include an option to view the customer care information 122, which may include the calling plan type for the handset 102, a recent amount of the prepaid handset minutes remaining on the calling plan, the amount of funds recently added to the calling plan, the date when funds were recently added to the calling plan, a recent bill, and the date when the next bill is due. The handset memory 118 stores the customer care information 122 on an occasional basis, which may be based on current handset usage, current network usage, and/or the frequency with which the handset 102 requests the customer care information 122 during a specified time period. For example, the server 110 may send updates for the customer care information 122 outside of peak calling hours when the handset 102 is not already communicating. If the handset 102 requests the customer care information 122 every four hours, the server 110 may update the customer care information 122 every four hours outside of peak hours when the handset 102 is not already communicating.

Because the server 110 updates the customer care information 122 only occasionally, at any point in time the customer care information 122 may not be the most current information. Therefore, one of the service options 120 may be for the handset 102 to request a current update of the customer care information 122 from the server 110. Other service options 120 may include an option to inquire about a bill, an option to communicate with the customer care center 108 in a specific language, and an option for the handset 102 to call the entered number. The handset memory 118 may store some selections, such as a requested language, so that when the service options 120 are subsequently displayed on the display, the stored selection is the default selection.

When the user of the handset 102 selects one of the service options 120, the care component 116 receives the selection and enables the handset 102 to communicate with the server 110 or the customer care center 108 based on the selection. For example, the handset 102 requests an update of the customer care information 122, specifically the most recent bill, from the server 110. After the handset 102 receives the requested data from the server 110, the handset 102 displays an option to call a specialist at the customer care center 108 about the received data. The handset 102 responds to the selection of the displayed option by directing the call to a connection for a specialist at the customer care center 108 that is determined by the received data, such as a specialist for bills when the handset 102 has received a bill update. Either the handset 102 or the server 110 may provide the received data to the specialist at the customer care center 108, who may view the received data when responding to the call or may have the option of selecting to view the received data when responding to the call.

The communication between the handset 102 and the server 110 may be via a web browser, an automated voice system, or text messages. The selection of some service options 120 may enable the bypassing of an option presented by an automated voice system, or enable the requested communication to be directed to a specific connection, such as a specialist for the type of problem the handset 102 is experiencing. Although some of the service options 120 discussed are examples for the customer care center 108, the service options 120 may be for other services, such as options that enable the handset 102 to bypass some options for purchasing tickets to a sporting event offered by a ticket agency's automated voice system. The care component 116 displays data received in response to selections via the display 112, such as displaying data from a text message received in response to a request for the most current amount of prepaid handset minutes remaining on the calling plan. By communicating with the server 110 via text messages, the handset 102 avoids lengthy voice communications by communicating quickly with the server 110. Text messages may minimize the communication time for the system 100, thereby minimizing expenses for the network service provider. Other forms of data communication could also be used as recognized by those of skill in the art.

Figure 2:
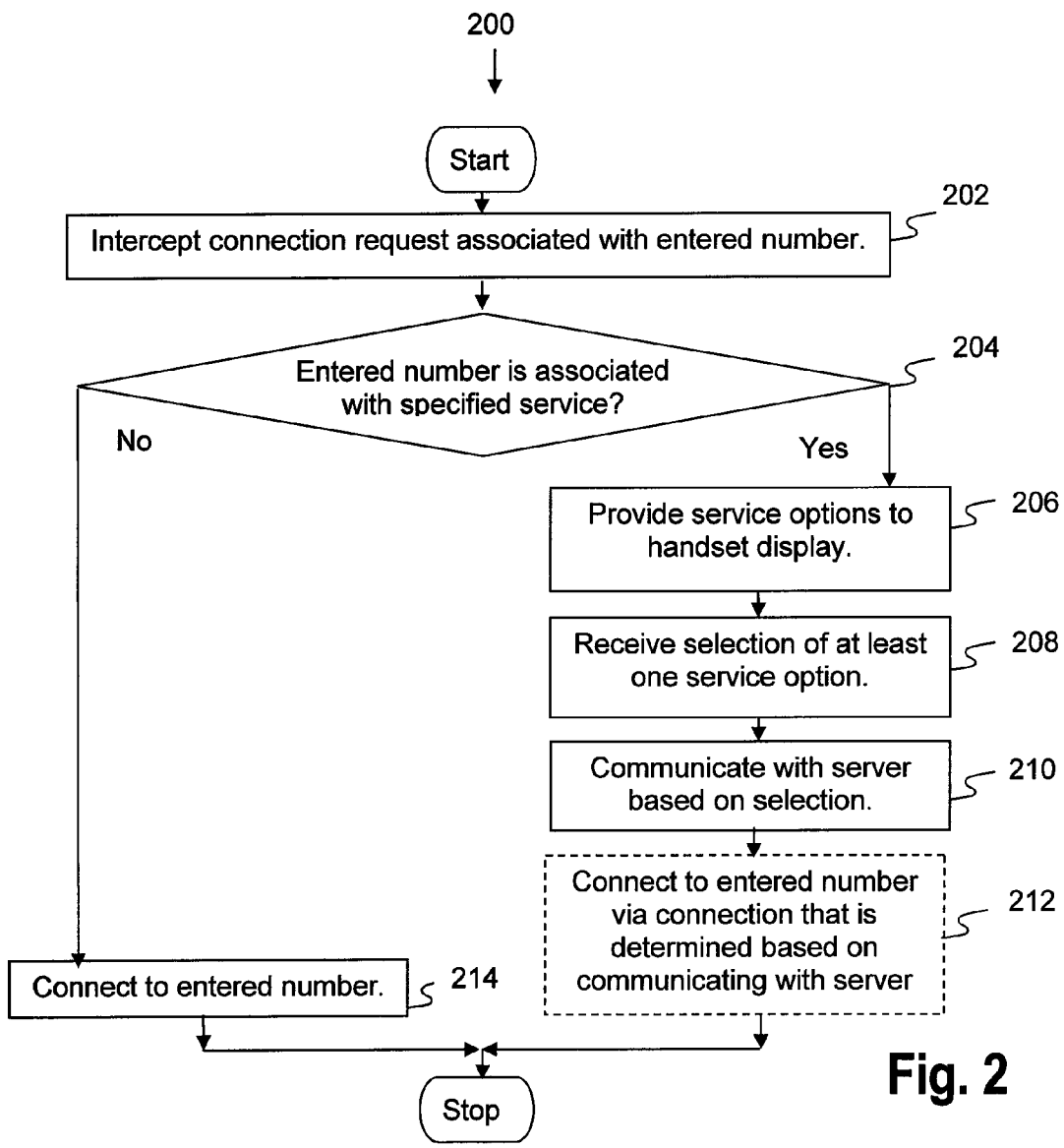
FIG. 2 shows a flowchart of a method for post-dial pre-connect handset customer care according to some embodiments of the present disclosure.

FIG. 2 shows a flowchart of a method 200 for post-dial pre-connect handset customer care according to some embodiments of the present disclosure. The system 100 can execute the method 200 to display the service options 120 and communicate with the server 110 or the customer care center 108 based on the service options 120 selected.

In box 202, a connection request associated with an entered number is intercepted. For example, the dialer component 114 intercepts the number 1-800-366-0707 entered to request the amount of prepaid handset minutes remaining on the calling plan.

In box 204, whether the entered number is associated with a specified service is determined. For example, the dialer component 114 determines that 1-800-366-0707 is used for requesting the amount of prepaid handset minutes remaining on the calling plan. If the dialer component 114 determines that 1-800-366-0707 is not associated with any specified service, the method proceeds to box 212. If the dialer component 114 determines that 1-800-366-0707 is associated with any specified service, the method continues to box 206.

In box 206, service options are provided to the handset display. For example, the care component 116 provides the service options 120 to the display 112, including the option to view the customer care information 122 already stored in the handset memory 118 and the option to request the most current amount of prepaid handset minutes remaining on the calling plan from the server 110.

In box 208, selection of at least one service option is received. For example, the care component 116 receives a request for the most current amount of prepaid handset minutes remaining on the calling plan.

In box 210, a server is communicated with based on the selection. For example, the handset 102 communicates with the server 110 via a text message based on the request, the server 110 provides the most current amount of minutes remaining on the calling plan to the display 112, and the method terminates. The handset 102 completed its communication quickly, without the need for a lengthy voice call to either the customer care center 108 or the server 110. The handset 102 also avoided any delays that occur while the user of the handset 102 makes numerous selections from an automated voice system on the server 110 to submit the request or while the user explains the request to a customer care representative at the customer care center 108.

In box 212, the entered number is connected to. For example, the handset 102 connects to the entered number that was not associated with any specified service.

Figure 3:
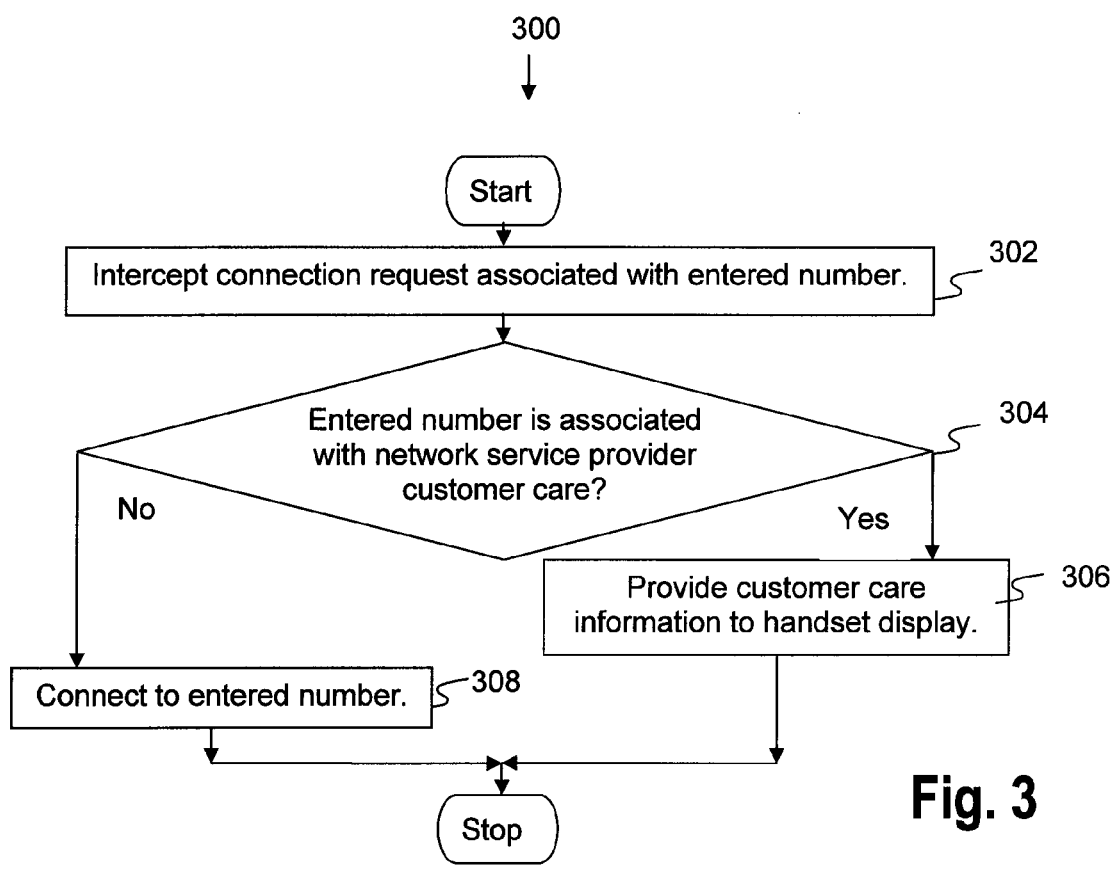
FIG. 3 shows a flowchart of another method for post-dial pre-connect handset customer care according to some embodiments of the present disclosure.

FIG. 3 shows a flowchart of a method 300 for post-dial pre-connect handset customer care according to some embodiments of the present disclosure. The system 100 can execute the method 300 for the handset 102 to display the customer care information 122 on the display 112 instead of communicating with either the customer care center 108 or the server 110.

In box 302, a connection request associated with an entered number is intercepted. For example, the dialer component 114 intercepts the number 1-800-366-0707 entered to request the amount of prepaid handset minutes remaining on the calling plan.

In box 304, whether the entered number is associated with a network service provider customer care is determined. For example, the dialer component 114 determines that 1-800-366-0707 is used for requesting the amount of prepaid handset minutes remaining on the calling plan. If the dialer component 114 determines that 1-800-366-0707 is associated with the network service provider customer care, the method continues to box 306. If the dialer component 114 determines that 1-800-366-0707 is not associated with the network service provider customer care, the method proceeds to box 308.

In box 306, customer care information is provided to the handset display. For example, the care component 116 provides the customer care information 122 already stored in the handset memory 118 to the display 112. The handset 102 provides a recent amount of prepaid handset minutes remaining on the calling plan without the need to communicate to either the customer care center 108 or the server 110. If the user of the handset wants to view the most recent amount of prepaid handset minutes remaining on the calling plan, the user may select from the service options 120, as discussed above in FIG. 2.

In box 308, the entered number is connected to. For example, the handset 102 connects to the entered number that was not associated with any specified service.

Figure 4:
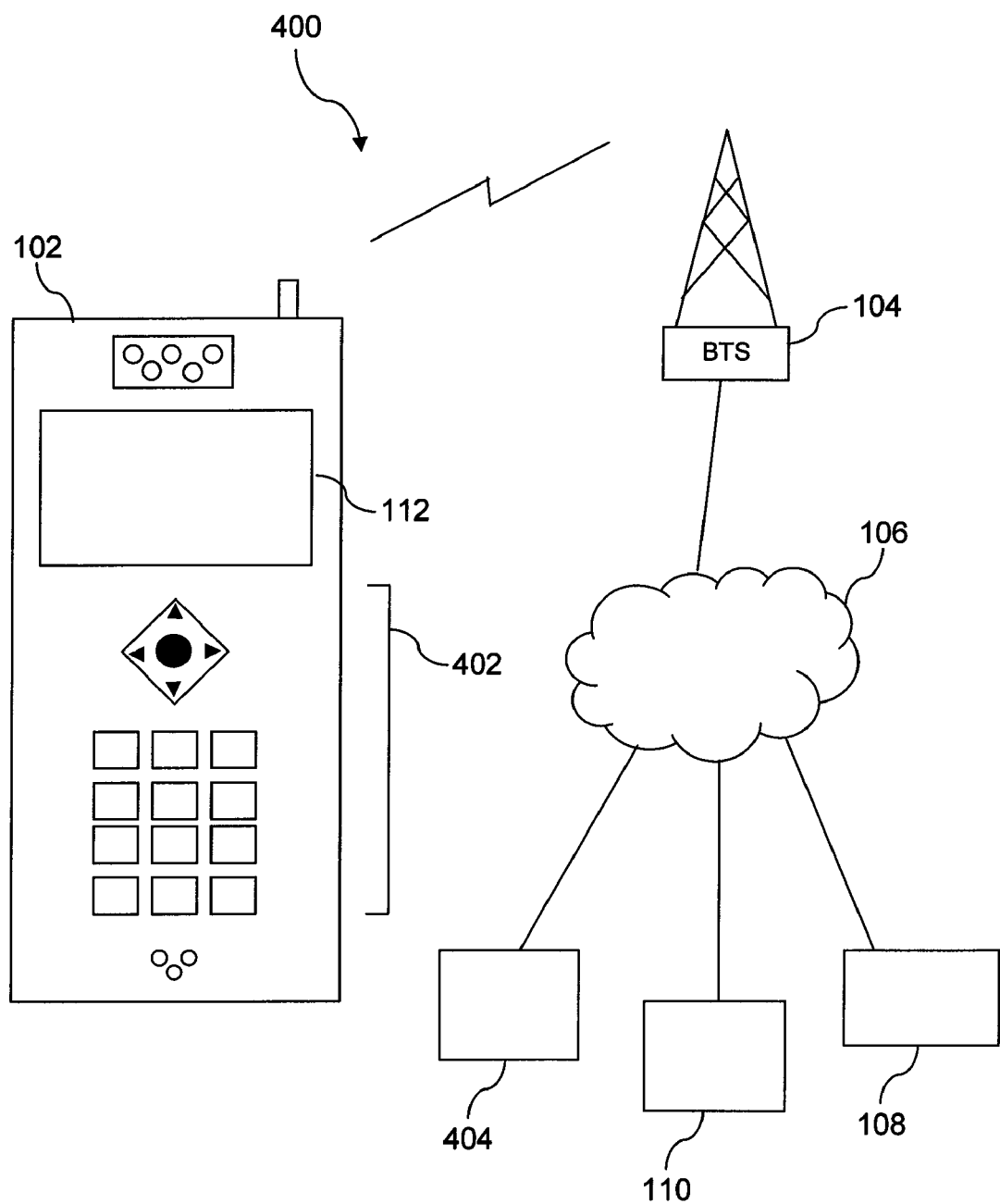
FIG. 4 shows an illustrative wireless communications system.

FIG. 4 shows a wireless communications system 400 including the mobile device 102. FIG. 4 depicts the handset 102, which may be referred to as mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, and a digital calculator. Many suitable mobile devices 102 combine some or all of these functions. In some embodiments of the present disclosure, the mobile device 102 is not a general purpose computing device, but rather is a special-purpose communications device such as a mobile phone, wireless handset, pager, or PDA. The mobile device 102 may support specialized activities such as gaming, inventory control, job control, and/or task management functions, and so on.

The mobile device 102 includes the display 112 and a touch-sensitive surface or keys 402 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 112 to show a web page. The web page may be obtained via wireless communications with the base transceiver station 104, a wireless network access node, a peer mobile device 102 or any other wireless communication network or system. While a single base transceiver station 104 is illustrated, it is understood that the wireless communication system may comprise additional base transceiver stations. In some instances, the mobile device 102 may be in communication with multiple base transceiver stations 104 at the same time. The base transceiver station 104 (or wireless network access node) is coupled to the network 106. Via the wireless link and the network 106, the mobile device 102 has access to information on various servers, such as a server 404. The server 404 may provide content that may be shown on the display 112. Alternately, the mobile device 102 may access the base transceiver station 104 through a peer mobile device 102 acting as an intermediary, in a relay type or hop type of connection.

Figure 5:
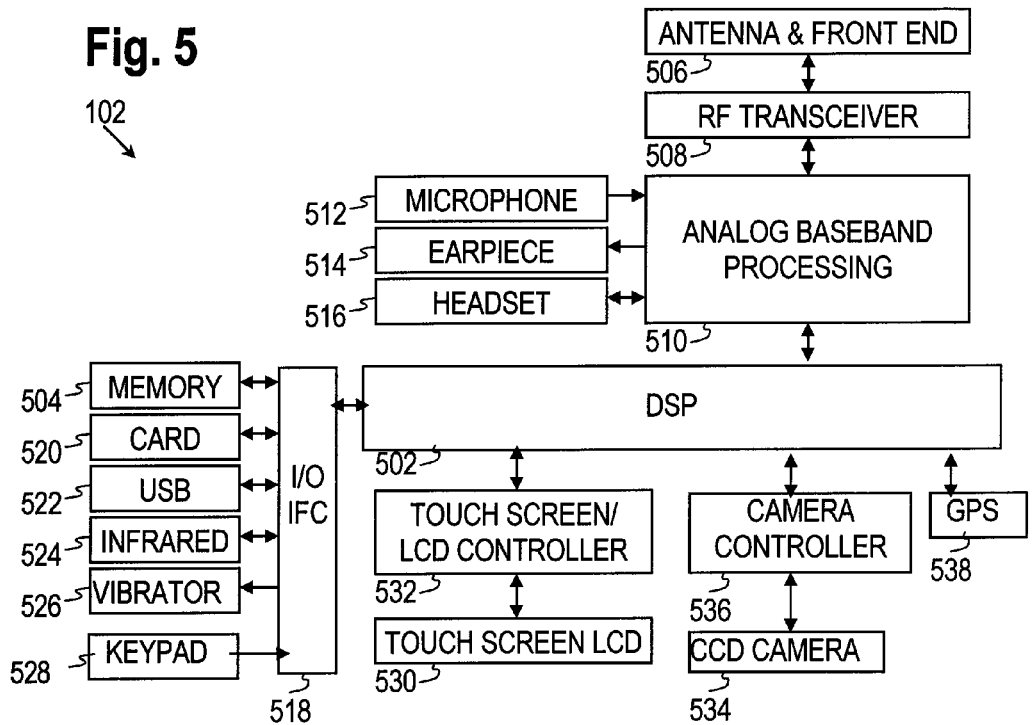
FIG. 5 shows a block diagram of an illustrative mobile device.

FIG. 5 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RE) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby mobile devices 102 and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
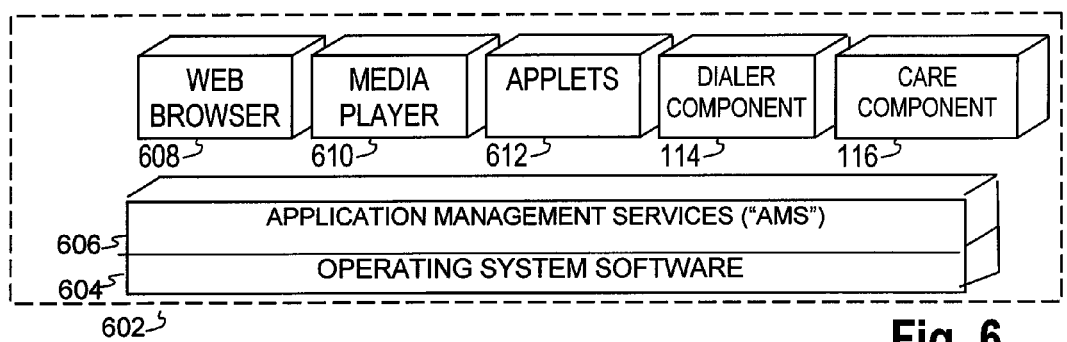
FIG. 6 shows a block diagram of an illustrative software configuration for a mobile device.

FIG. 6 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile device 102. Also shown in FIG. 6 are a web browser application 608, a media player application 610, JAVA applets 612, the dialer component 114, and the care component 116. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
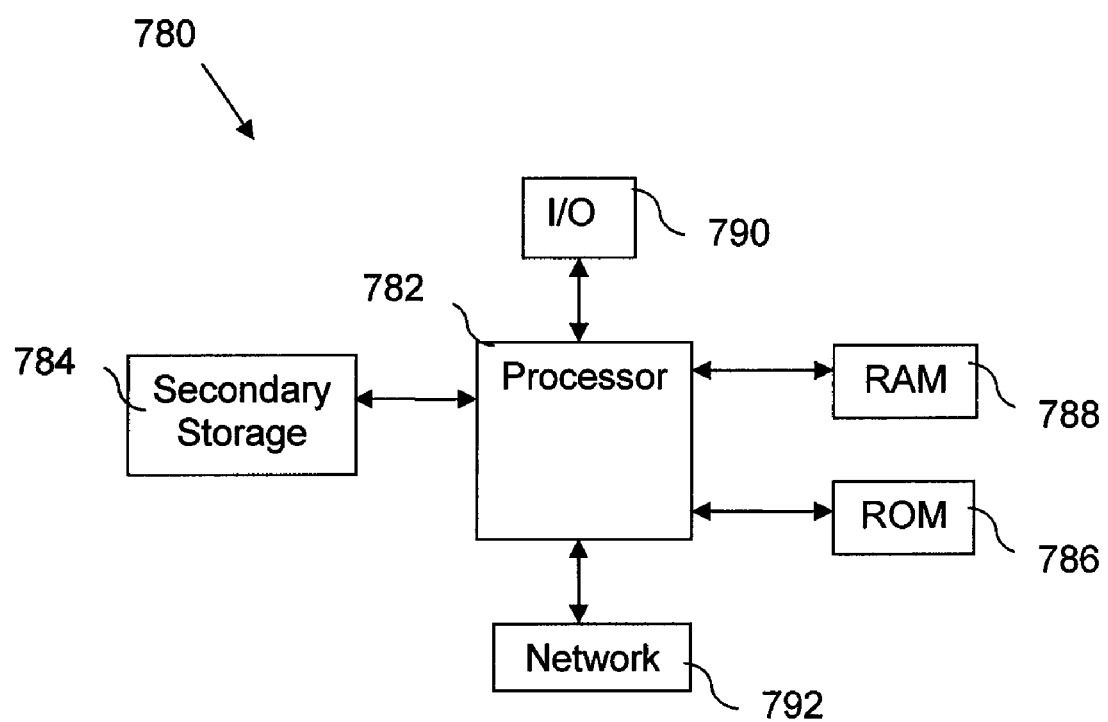
FIG. 7 shows an illustrative general purpose computer system suitable for implementing portions of the several embodiments of the present disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for handset customer care, comprising:
   a handset comprising:
      a processor;
      a display;
      a dialer component, when executed by the processor, to intercept a connection request associated with an entered number, and to determine whether the entered number is associated with at least one number on a list of service numbers; and
      a care component, when executed by the processor, to provide service options to the display in response to a determination that the entered number is associated with the at least one number on the list of service numbers, to receive selection of at least one of the service options, and to communicate with a server based on the selection;
   wherein the handset connects to the entered number in response to a determination that the entered number is not associated with the at least one number on the list of service numbers.

2. The system of claim 1, wherein the handset is associated with a prepaid billing plan.

3. The system of claim 1, wherein the entered number that is associated with the at least one number on the list of service numbers is one of a full number used to call the specified service and a shortcut number used to call a specified service.

4. The system of claim 1, wherein the service options comprise at least one of an option to request at least one of an amount of prepaid handset minutes currently remaining, an option to inquire about a bill, and an option to request service related to the entered number.

5. The system of claim 1, further comprising a handset memory to store the service options.

6. A method for handset customer care, comprising:
   intercepting a connection request associated with an entered number;
   determining whether the entered number is associated with at least one number on a list of service numbers;
   providing service options to a handset display in response to a determination that the entered number is associated with the at least one number on the list of service numbers;
   receiving selection of at least one of the service options;
   communicating with a server based on the selection;
   connecting to the entered number via a connection that is determined based on communicating with the server; and
   connecting to the entered number in response to a determination that the entered number is not associated with the at least one number on the list of service numbers.

7. The method of claim 6, wherein communicating with the server comprises communicating via a web browser.

8. The method of claim 7, further comprising displaying data received via the web browser in response to the selection.

9. The method of claim 6, wherein communicating with the server comprises communicating with an automated voice system.

10. The method of claim 9, wherein receiving selection of the at least one of the service options enables the bypassing of an option presented by the automated voice system.

11. The method of claim 6, wherein communicating with the server comprises communicating via text messages.

12. The method of claim 11, further comprising displaying a text message received in response to the selection to the handset display.

13. The method of claim 6, further comprising connecting to the entered number in response to a selection of an option to request service related to the entered number.

14. The method of claim 6, wherein receiving selection of the at least one of the service options enables connecting to the entered number to be directed to a specific connection.

15. The method of claim 6, wherein communicating with the server comprises receiving data that is used by a customer care specialist that communicates via the connection.

16. A system for handset customer care, comprising:
   a handset comprising:
      a processor;
      a display;
      a dialer component, when executed by the processor, to intercept a connection request associated with an entered number, and to determine whether the entered number is associated with at least one number on a list of customer care center numbers; and
      a care component, when executed by the processor, to provide customer care information to the display in response to a determination that the entered number is associated with the at least one number on the list of customer care center numbers, wherein the handset connects to the entered number in response to a determination that the entered number is not associated with the at least one number on the list of customer care center numbers.

17. The system of claim 16, wherein the customer care information comprises at least one of an amount of prepaid handset minutes remaining at a specified earlier time, a calling plan type, an amount of funds recently added, a date when funds were recently added, a recent bill, and a date when a next bill is due.

18. The system of claim 16, further comprising a handset memory to store the customer care information, wherein the handset memory stores the customer care information on an occasional basis.

19. The system of claim 17, wherein the occasional basis is based on at least one of current handset usage and current network usage.

20. The system of claim 17, wherein the occasional basis is based on a frequency with which the handset requests the customer care information.

* * * * *